United States Patent [19] [11] Patent Number: 4,946,725
Harlan [45] Date of Patent: Aug. 7, 1990

[54] EQUIPMENT SUPPORT PAD AND METHOD

[75] Inventor: Samuel P. Harlan, San Bruno, Calif.

[73] Assignee: Homac Mfg. Company, Ormond Beach, Fla.

[21] Appl. No.: 228,622

[22] Filed: Aug. 4, 1988

[51] Int. Cl.⁵ ............................................. B32B 3/12
[52] U.S. Cl. ..................................... 428/73; 248/346;
264/251; 428/117; 524/5
[58] Field of Search ................ 248/346, 637; 264/251,
264/259; 524/5; 428/73, 116, 117, 118

[56] References Cited

U.S. PATENT DOCUMENTS

| 3,722,845 | 3/1973 | Unger | 248/542 |
|---|---|---|---|
| 3,934,805 | 1/1976 | Elaschuk | 248/346 |
| 3,962,660 | 6/1976 | Duckett | 248/346 X |
| 4,023,755 | 5/1977 | Alesi, Jr. | 248/346 X |
| 4,050,659 | 9/1977 | McCannon et al. | 248/346 X |
| 4,056,251 | 11/1977 | Dixon et al. | 248/346 X |
| 4,212,446 | 7/1980 | Domanick et al. | 248/678 |
| 4,399,972 | 8/1983 | McCulloch | 248/346 |
| 4,490,410 | 12/1984 | Takiyama et al. | 428/116 X |
| 4,505,449 | 3/1985 | Turner et al. | 248/669 |
| 4,645,171 | 2/1987 | Heide | 248/637 |
| 4,653,243 | 3/1987 | Burkett | 524/5 X |
| 4,670,208 | 6/1987 | Koblischek et al. | 428/117 X |
| 4,725,632 | 2/1988 | Vess | 524/5 X |

Primary Examiner—Henry F. Epstein
Attorney, Agent, or Firm—John E. Benoit

[57] ABSTRACT

A method of constructing an equipment pad and the resultant pad is disclosed. The method comprises the steps of providing a mold with fiberglass material laminated to the interior walls of the mold, providing a layer of polymer concrete in the base of the mold, covering the layer of concrete with a sheet of fiberglass material, covering the fiberglass material with an additional layer of polymer concrete, placing honeycomb material on the additional layer of concrete, filling selected cells of said honeycomb material with a polymer concrete, laminating a fiberglass sheet to the upper surface of the honeycomb material and sealing the upper sheet of fiberglass to the fiberglass laminated to the walls of the mold. The finished pad is then removed from the mold and inverted. If desired, an opening may be molded into the pad.

10 Claims, 4 Drawing Sheets

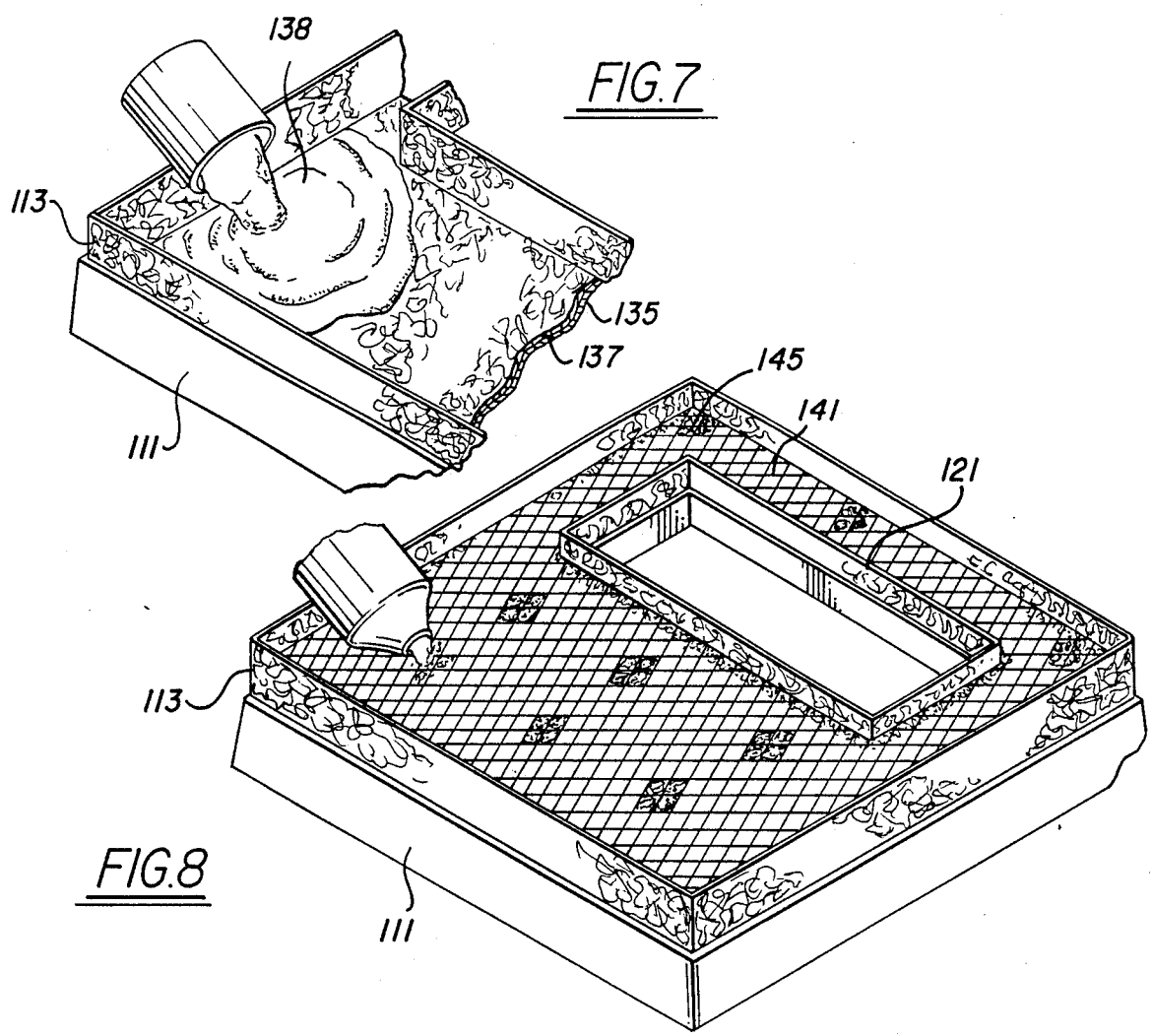
FIG. 7
FIG. 8
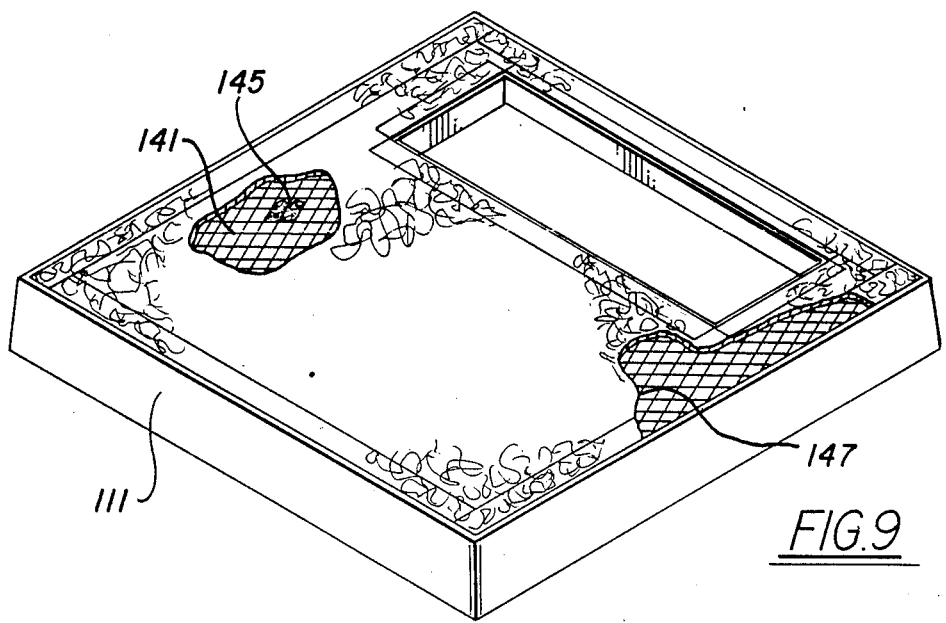
FIG. 9

EQUIPMENT SUPPORT PAD AND METHOD

This invention relates generally to support pads and, more specifically, to pads which support equipment such as electrical transformers and the like.

Equipment support pads used in the electric utility area are normally used for transformers. The same, or sometimes similar, pads are used by the telephone companies as distribution and termination points. Pads are simply footings designed to withstand, with adequate factors of safety, the weight of the heaviest piece of equipment for which they are designed. Standard pad designs in use at the present time include a polymer concrete top supported by a corrugated panel which is usually made of fiber-reinforced polyester. While this construction is sound and has been well accepted, it has two disadvantages. One is the weight of the pad and the other is the cost. The pads in normal use weigh about one hundred twenty pounds. This would be for a pad approximately 42"×42". Further, any reduction in the costs of the pads is obviously desirable.

Accordingly, it is an object of the present invention to provide equipment support pads which may be constructed more economically than pads in present use.

Yet another object of the invention is to provide equipment storage pads which substantially reduce the weight of the pad as compared to pads which are in use at the present time.

A further object of the present invention is to provide a pad which is reduced in weight and is produced at a lower cost without loss of structural strength.

These and other objects of the invention will become apparent from the following description taken together with the accompanying drawings.

SUMMARY OF THE INVENTION

The invention discloses an equipment support pad and the method of constructing such a pad. The pad is produced by providing a mold which is open at the top, has walls, and is of the dimension desired for the pad. It also includes an interior wall which provides the necessary cable opening. A layer of polymer concrete is poured within the mold, excluding the area within the interior wall, and a honeycomb material is placed upon this concrete base. A selected number of cells of the honeycomb material are filled with polymer concrete so as to provide support columns. A covering of water impervious material is laminated over the top of the honeycomb material and the sides of the entire support pad.

BRIEF DESCRIPTION OF THE DRAWINGS

FIG. 7 is a perspective view of the step of adding an additional layer of polymer concrete;

FIG. 8 is a perspective view of the step of placing a honeycomb structure over the additional layer of concrete and the pouring of the concrete columns;

FIG. 9 is a partial cross-section perspective view showing the additional water impervious material on top of the honeycomb material;

DETAILED DESCRIPTION OF THE PREFERRED EMBODIMENT

Figure 1:
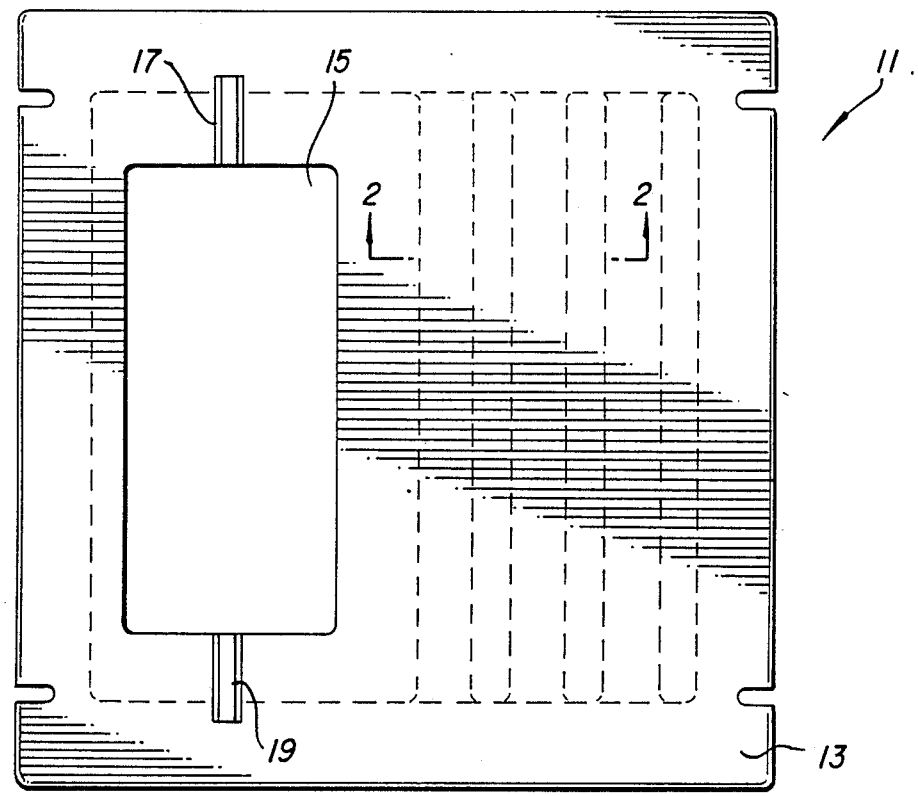
FIG. 1 is a plan view of a prior art pad.

FIG. 1 is a plan view of a prior art pad 11 having non-skid surface 13 and cable opening 15 with unistruts 17 and 19 adjacent thereto. A unistrut is a standard term used relative to mountings. The structure is a hollow slotted steel channel which accepts the shank of a bolt but restricts the bolt head. Such a channel is shown in U.S. Pat. No. 4,056,251 issued Nov. 1, 1977.

Figure 2:
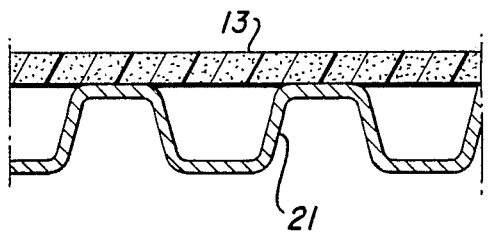
FIG. 2 is a partial sectional view taken through lines 2—2 of FIG. 1.

FIG. 2 is a partial cross-sectional view taken through 2—2 of FIG. 1 including non-skid surface 13 which is formed of polymer concrete. This type of pad uses a corrugated fiberglass base 21. In this configuration, the bottom of base 21 rests on the ground.

Figure 3:
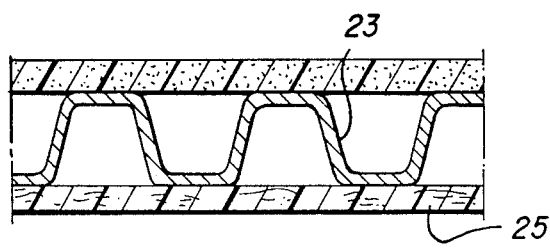
FIG. 3 is a partical sectional view of a further prior art pad.

FIG. 3 is a partial cross-sectional view of a pad similar to that shown in FIG. 2 using corrugated fiberglass 23 and a flat fiberglass base 25. In this configuration, base 25 rests on the ground.

The pads of FIGS. 1-3 utilize fiberglass for structural purposes and to provide limited bearing between platform and base. The attainment of these functions with this material results in a pad of substantial weight and cost.

Figure 4:
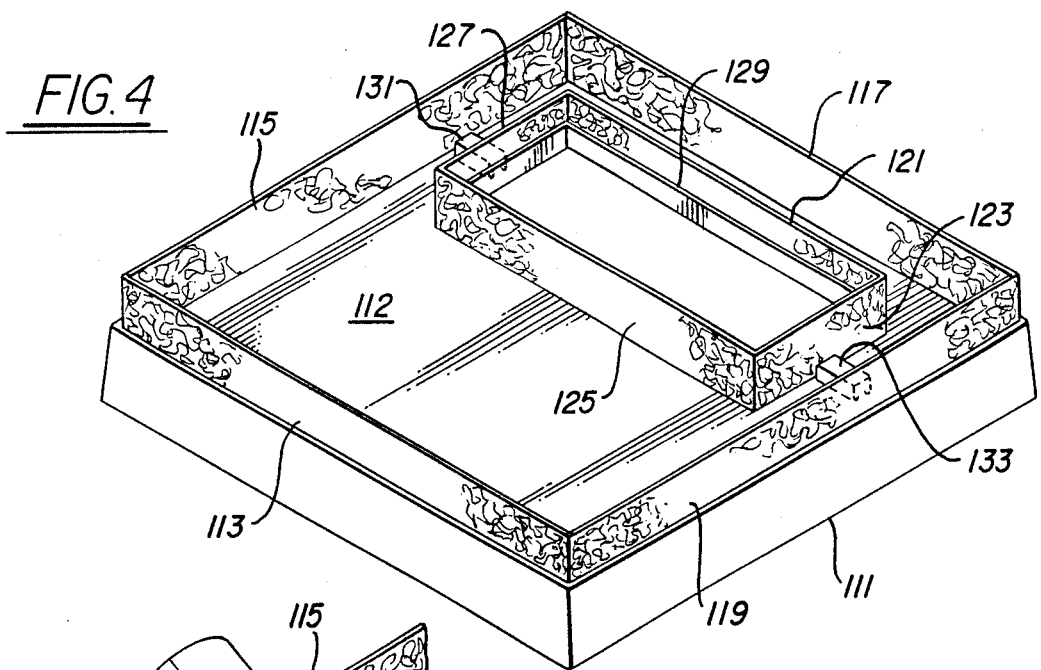
FIG. 4 is a perspective view of the mold used with the present invention, with the sides of the pad mounted therein.

Referring now to FIG. 4, there is disclosed a mold having sides 111 which surround base 112. Fiberglass strips 113, 115, 117, and 119 are formed about to the inner surfaces of mold walls 111. In order to provide access to cables used with the equipment, an opening through the pad is provided. In the mold shown, an interior mold 129 is placed within the exterior mold with unistruts 131 and 133 being positioned adjacent the opening. These unistruts, which are used in the pads of the prior art, remain as part of the finished support pad. Bolts are used to secure the equipment, such as transformers, to the unistruts.

Fiberglass strips 121, 123, 125, and 127 are formed about to the exterior of mold 129 prior to the positioning of the unistruts.

Figure 5:
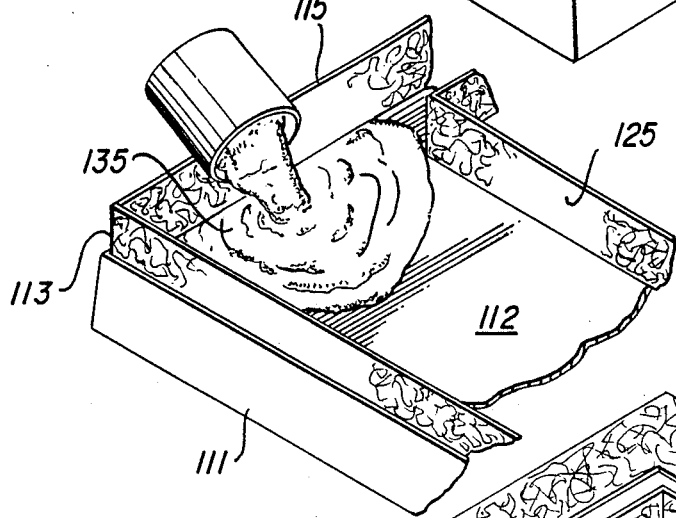
FIG. 5 is a partial perspective view showing the pouring of a first layer of polymer cement.
Figure 6:
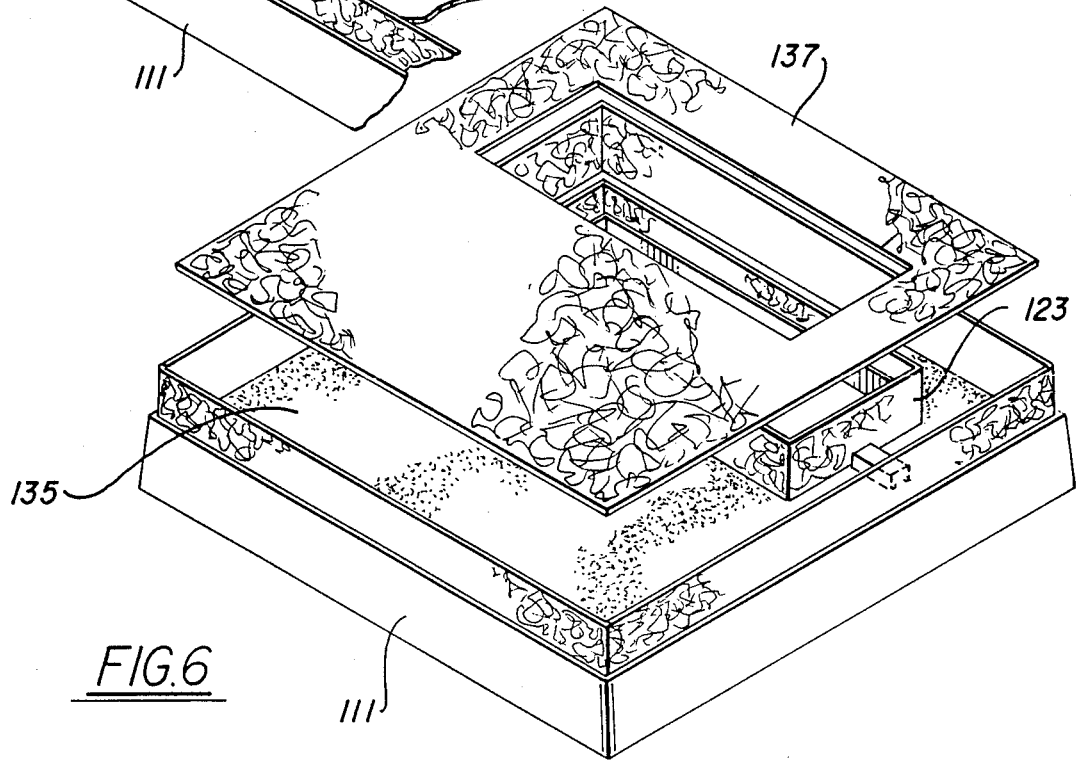
FIG. 6 is a perspective view of the step of adding the water impervious material over the cement of FIG. 5.

After the mold is completed to the degree as shown in FIG. 4, polymer concrete 135 is poured onto and covers base 112 to a predetermined depth, as illustrated in FIG. 5. This polymer concrete slurry is allowed to set and a sheet of fiberglass 137, cut to the mold configuration and size, is laid over polymer concrete 135, as indicated in FIG. 6.

The mold is then poured with a final slurry of polymer concrete 138, as shown in FIG. 7. Honeycomb material 141, such as a kraft paper honeycomb manufactured by Honeycomb Structural Products, Inc., is shown in FIG. 8 placed over the layer of slurry concrete 138. As can be seen, a selected number of supporting columns 145 are constructed by pouring slurries of polymer concrete through selected cells of the honeycomb. In the illustration of FIG. 8 such supporting columns are formed at each corner and in selected areas of the honeycomb. While the illustration of FIG. 8 shows the columns being formed after the honeycomb is in place, they could be formed in the honeycomb before it is placed in the mold. In either case, when the honeycomb is placed on the final slurry of concrete 138, it is cemented thereto. A further fiberglass sheet 147, cut to the proper size, is laminated over the honeycomb as shown in FIG. 9. Sheet 147 of fiberglass is sealed to the projections of fiberglass vertical walls 113, 115, 117, and 119 by bending the walls downwardly and properly sealing the finished structure.

Figure 10:
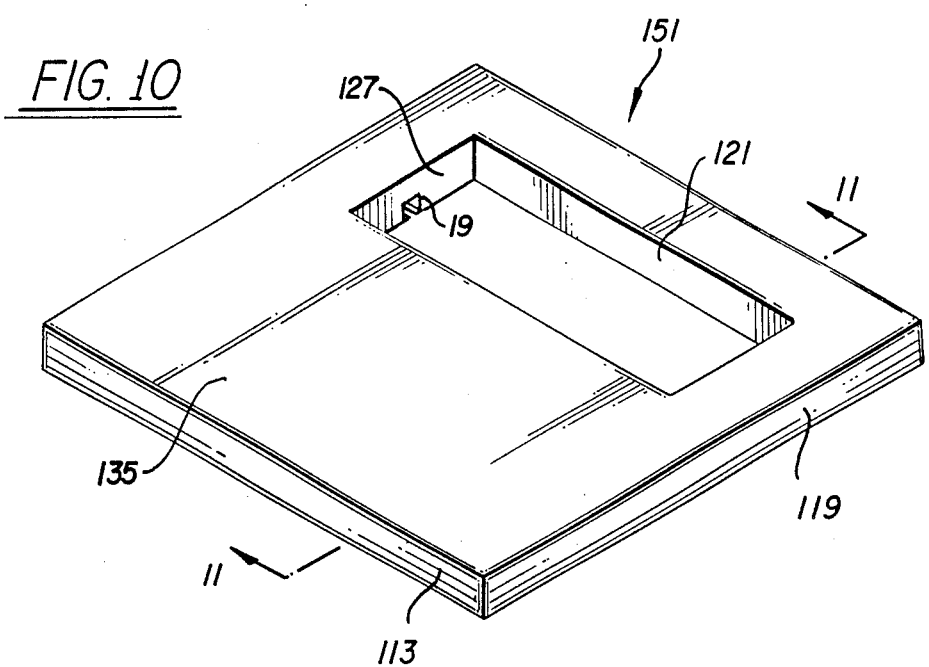
FIG. 10 is a perspective view of the completed support pad.

The finished product 151 is removed from the mold and is illustrated in FIG. 10. It is noted that the original concrete slurry 135 (FIG. 5) forms the polymer concrete top of the mold, while the final layer of fiberglass sheet 147 (FIG. 11) forms the bottom of the the mold product. The sides of the molded product comprise fiberglass strips 113 and the interior sides of the opening through the pad comprise fiberglass strips such as strips 121 and 127.

Figure 11:
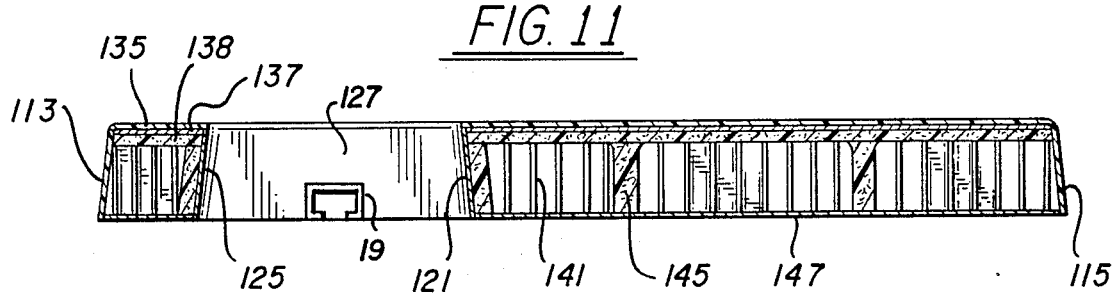
FIG. 11 is a cross-sectional view taken through lines 8—8 of FIG. 10.

FIG. 11 is a sectional view taken through the lines 11—11 of FIG. 10 and illustrates the relationship of the layers described above consisting of polymer concrete surface 135, fiberglass sheet 137, polymer concrete layer 138, honeycomb material 141, and fiberglass sheet 147. Also shown are polymer concrete sup porting columns 145 created in the honeycomb structure, as discussed above.

The material used for the honeycomb is kraft paper impregnated with a thermosetting phenolic resin. This treatment gives kraft paper much higher strength when wet, resistance to normal moisture absorption, and greatly increased compression and shear strength. It is, of course, light in weight.

The weight of this structural honeycomb is about 1.1 pounds per cubic foot. Fiberglass used in the prior art for structural purposes weights about 100 pounds per cubic foot. Using the honeycomb instead of fiberglass for bearing in the present invention provides obvious weight reduction. It also reduces cost.

Mechanically, the compressive strength of the honeycomb material ranges from about 3,300 to 23,000 pounds per square foot, depending on the size of the hexagonal nodes and the resin content specified. One size which may be used in the present invention has 1" cross flats hexagonal openings and, with the specified resin content, has compressive strength of about 7200 pounds per square foot.

Resistance to moisture absorption is a very desirable characteristic in this or any material subject to severe outdoor weathering. Accordingly, water impervious ;material such as fiberglass is used.

Of primary importance is the fact that the hexagonal openings provided in the honeycomb make possible the pouring of polymer concrete columns through this material, so that the poured columns provide the structural strength.

The honeycomb material provides bearing strength. In the pad illustrated, which is 42"×42", a honeycomb having continuous 1" cross flats hexagonal openings is used, which has the previously indicated compressive strength of about 7,200 pounds per square inch, entirely suitable for use in the present invention. Since the weight of this honeycomb size is 1.1 pounds per cubic foot, it is little more than 1% of the weight of fiberglass. Bearing is applied to the complete internal areas of the platform and base. This greater amount of bearing than provided by the prior art fiberglass structures helps avoid punctures from stone beddings commonly used in footings. It also contains and absorbs any moisture present in punctures which may occur.

The above description and drawings are illustrative, only, since the components of the pad could be altered without departing from the invention, the scope of which is to be limited only by the following claims.

I claim:

1. An equipment support pad comprising
   a substantially flat top layer of polymer concrete;
   a layer of fiberglass material adjacent said top;
   a second layer of polymer concrete adjacent said layer of fiberglass;
   honeycomb material of a predetermined thickness having one surface adjacent said second layer of polymer concrete;
   a plurality of polymer concrete supporting columns within selected cells of said honeycomb material, said columns being of a height substantially equal to the thickness of said honeycomb material;
   a layer of fiberglass sheet material laminated over the other surface of said honeycomb material; and
   fiberglass strips laminated about the periphery of said pad.

2. The equipment support pad of claim 1 further comprising
   an opening extending through said pad; and
   fiberglass strips laminated about the interior of said opening.

3. An equipment support pad comprising
   a polymer concrete top;
   honeycomb material of a predetermined thickness having one face secured to said top;
   a plurality of polymer concrete supporting columns within said honeycomb, said columns being of a height substantially equal to the thickness of said honeycomb material;
   a fiberglass sheet laminated to said honeycomb material on the other face thereof; and
   a fiberglass strip laminated about the periphery of said pad.

4. The equipment support pad of claim 3 further comprising
   an opening extending within and through said pad.

5. The equipment support pad of claim 4 further comprising
   a fiberglass strip molded about the interior of said opening.

6. A method of constructing an equipment support pad comprising
   providing a mold having peripheral walls;
   forming strips of fiberglass about the interior of said walls;
   providing a layer of polymer concrete within the bottom of said mold;
   placing honeycomb material over said layer of polymer concrete;
   filling selected cells of said honeycomb material with a polymer concrete;
   covering the top of said honeycomb material and polymer concrete with a fiberglass sheet; and
   removing said pad from said mold.

7. The method of claim 6 further comprising
   providing an interior opening extending through said polymer concrete, honeycomb material, and said fiberglass sheet material.

8. The method of claim 7 further comprising covering the inside walls of said opening with fiberglass strip material.

9. A method of constructing an equipment support pad comprising providing a mold having a base and walls extending upwardly about the periphery of said base;

forming strips of fiberglass about the interior ;sides of said walls;

pouring a first layer of polymer concrete over said base within said walls;

laying a sheet of fiberglass over said first layer of polymer concrete;

pouring a second layer of polymer concrete over said fiberglass;

filling selected cells of a sheet of honeycomb material with polymer concrete;

placing one face of said honeycomb material on said second layer of polymer concrete;

laminating a fiberglass sheet over the other face of said honeycomb material; and removing said support pad from said mold.

10. The method of claim 9 further comprising placing a smaller second walled mold within said mold before pouring said first layer of concrete; and forming strips of fiberglass about the exterior of the walls of said smaller mold.

* * * * *